(12) United States Patent
Altberg et al.

(10) Patent No.: US 8,521,596 B2
(45) Date of Patent: *Aug. 27, 2013

(54) METHOD AND APPARATUSES FOR OFFLINE SELECTION OF PAY-PER-CALL ADVERTISERS

(75) Inventors: Ebbe Altberg, Mill Valley, CA (US); Marc Barach, Oakland, CA (US); Scott Faber, San Francisco, CA (US); Michael Fordyce, San Francisco, CA (US); Chris Hickson, East Palo Alto, CA (US); Ron Hirson, San Francisco, CA (US); John Somorjai, San Mateo, CA (US); Sean Van der Linden, Berkeley, CA (US)

(73) Assignee: Ingenio LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/517,754

(22) Filed: Jun. 14, 2012

(65) Prior Publication Data

US 2013/0012158 A1 Jan. 10, 2013

Related U.S. Application Data

(63) Continuation of application No. 12/062,425, filed on Apr. 3, 2008, now Pat. No. 8,209,225, which is a continuation of application No. 11/092,309, filed on Mar. 28, 2005, now Pat. No. 7,366,683, which is a continuation-in-part of application No. 11/014,073, filed on Dec. 15, 2004, now Pat. No. 7,424,442, which is a continuation-in-part of application No. 10/872,117, filed on Jun. 17, 2004, now Pat. No. 8,024,224, which is a continuation-in-part of application No. 11/021,939, filed on Dec. 23, 2004, now Pat. No. 8,027,878, which is a continuation-in-part of application No. 10/679,982, filed on Oct. 6, 2003, now Pat. No. 7,120,235.

(60) Provisional application No. 60/552,124, filed on Mar. 10, 2004, provisional application No. 60/568,156, filed on May 4, 2004, provisional application No. 60/560,926, filed on Apr. 9, 2004, provisional application No. 60/653,660, filed on Feb. 16, 2005.

(51) Int. Cl.
*G06Q 30/00* (2012.01)

(52) U.S. Cl.
USPC .............. 705/14.69; 705/14.57; 705/14.58; 705/14.49; 705/34; 379/133

(58) Field of Classification Search
USPC .............. 705/14.73, 34, 14.49, 14.57, 14.58, 705/14.69; 379/133
See application file for complete search history.

(56) References Cited

U.S. PATENT DOCUMENTS

| | | | | |
|---|---|---|---|---|
| RE36,111 E | * | 2/1999 | Neville | 379/127.01 |
| 6,026,375 A | * | 2/2000 | Hall et al. | 705/26.43 |
| 6,769,020 B2 | * | 7/2004 | Miyazaki et al. | 709/219 |
| 6,847,992 B1 | * | 1/2005 | Haitsuka et al. | 709/218 |
| 7,092,091 B2 | * | 8/2006 | Itoh et al. | 356/338 |
| 2003/0220866 A1 | * | 11/2003 | Pisaris-Henderson et al. | 705/37 |

FOREIGN PATENT DOCUMENTS

WO WO 9847295 A1 * 10/1998

* cited by examiner

*Primary Examiner* — Raquel Alvarez
(74) *Attorney, Agent, or Firm* — Greenberg Traurig, LLP

(57) ABSTRACT

Methods and apparatuses to connect telephone calls and track information about the telephone calls resulting from advertisements for groups of advertisers. In one embodiment, a method includes: determining a geographic area after receiving a telephone call to a first telephone number publicized in an advertisement; determining a telephone number of a first advertiser; and connecting the telephone call to the telephone number of the first advertiser, the first advertiser billed for the advertisement based on telephonic connections made to connect the first advertiser and telephone calls to the first telephone number.

20 Claims, 22 Drawing Sheets

SCROLL DOWN to see more listings      Refine your search by Zip Code:

Your search found 105 listings, Listings 1 to 15 listed below...

Thinking of buying a new car?
Fill out iMotors' simple online form and receive a free new car quote from a local dealer by email within 24 hours. There is no obligation and no hassle. Serious buyers only please.

FEATURED DIRECTORY LISTINGS      SCROLL DOWN for more listings
                                                          City Gold

Dream Car Rentals
3734 Las Vegas Blvd.
LAS VEGAS, NV
Phone: (702)555-6661
Fax: (702) 555-6666

We Specialize in Excitement! Ferrari's, Viper's Porsche's & Hummers, Harley-Davidson's and SUV's, "DRIVE THE DREAM"

City Gold

RENT-A-VETTE
5021 SWENSON STREET
LAS VEGAS, NV 89119
Phone: (702) 555-2692
Fax: (702) 555-2044

ONLINE LISTINGS      SCROLL DOWN for more listings

Expedia: For All Your Car Rental Needs http://www.expedia.com
Save with Expedia.com, your one-stop source for flights, hotels, vacation packages, cruises, and rental

FIG. 9

METHOD AND APPARATUSES FOR OFFLINE SELECTION OF PAY-PER-CALL ADVERTISERS

CROSS-REFERENCE TO RELATED APPLICATION

The present patent application is a continuation of U.S. patent application Ser. No. 12/062,425 filed Apr. 3, 2008, which is a continuation of U.S. patent application Ser. No. 11/092,309, filed Mar. 28, 2005, which is a continuation-in-part of the following patent applications: 1) U.S. patent application Ser. No. 11/014,073, filed Dec. 15, 2004; 2) U.S. patent application Ser. No. 10/872,117, filed Jun. 17, 2004, which claims priority from Provisional U.S. Patent Application Ser. No. 60/552,124, filed Mar. 10, 2004; and 3) U.S. patent application Ser. No. 11/021,939, filed Dec. 23, 2004, which is a continuation-in part of U.S. patent application Ser. No. 10/679,982, filed Oct. 6, 2003. In addition, U.S. patent application Ser. No. 11/092,309 claims priority from Provisional U.S. Patent Application Ser. No. 60/568,156, filed May 4, 2004, Provisional U.S. Patent Application Ser. No. 60/560,926, filed Apr. 9, 2004, and Provisional U.S. Patent Application Ser. No. 60/653,660, filed Feb. 16, 2005. All the above-referenced applications are incorporated herein by reference.

FIELD OF THE INVENTION

At least some embodiments of the present invention relate to telephonic connections and advertising in general and performance-based advertising in particular.

BACKGROUND OF THE INVENTION

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a package switched network for a telephone connection. A package switched network is typical in a computer data environment. Recent developments in the field of Voice over IP (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a consumer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that it appears or is placed at a particular spot, e.g., at the top of a search engine result page, thereby to increase the odds of the advertisement being selected.

Both forms of performance-based advertising, i.e., paid placement and paid inclusion, suffer from the limitation that an advertiser or participant within a paid placement or paid inclusion advertising program is required to have a web presence, in the form of a web page. However, there are advertisers that either (a) do not have web pages, or (b) have web pages that are not effective at capturing the value of a web visitor, and are therefore unable, or unwilling, to participate in the traditional performance-based advertising, as described above.

BRIEF SUMMARY OF THE INVENTION

Methods and apparatuses to connect telephone calls and track information about the telephone calls resulting from advertisements for groups of advertisers are described here. In one embodiment, a method includes: determining a geographic area after receiving a telephone call to a first telephone number publicized in an advertisement; determining a telephone number of a first advertiser; and connecting the telephone call to the telephone number of the first advertiser, the first advertiser billed for the advertisement based on telephonic connections made to connect the first advertiser and telephone calls to the first telephone number.

BRIEF DESCRIPTION OF THE DRAWINGS

FIG. 9 shows an example of a search engine result page, which includes an advertisement generated, in accordance with one embodiment of the present invention;

DETAILED DESCRIPTION OF THE INVENTION

In the following description, for purposes of explanation, numerous specific details are set forth in order to provide a thorough understanding of the description. It will be apparent, however, to one skilled in the art that the invention can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
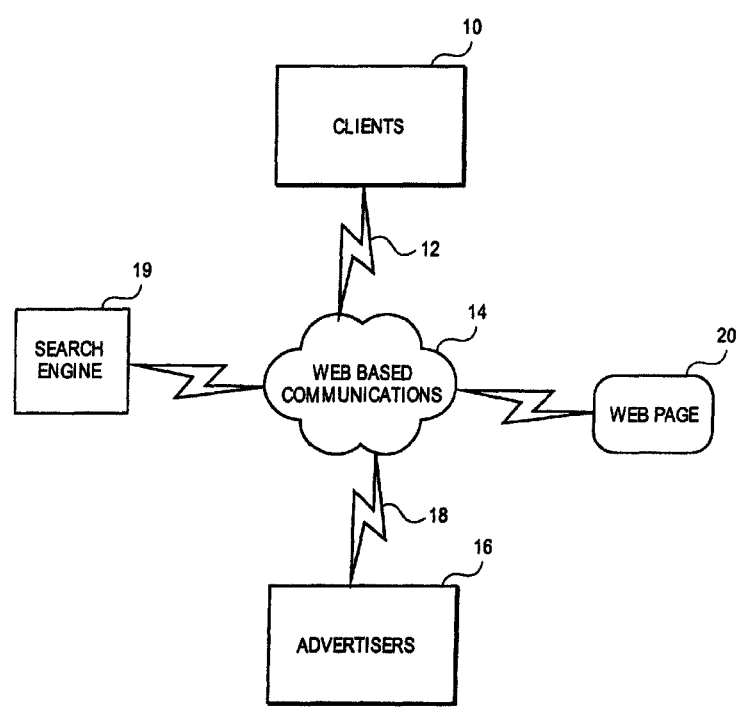
FIG. 1 shows how clients and advertisers interact with each other using a paid placement, or a paid inclusion advertising model, in accordance with the prior art.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 2:
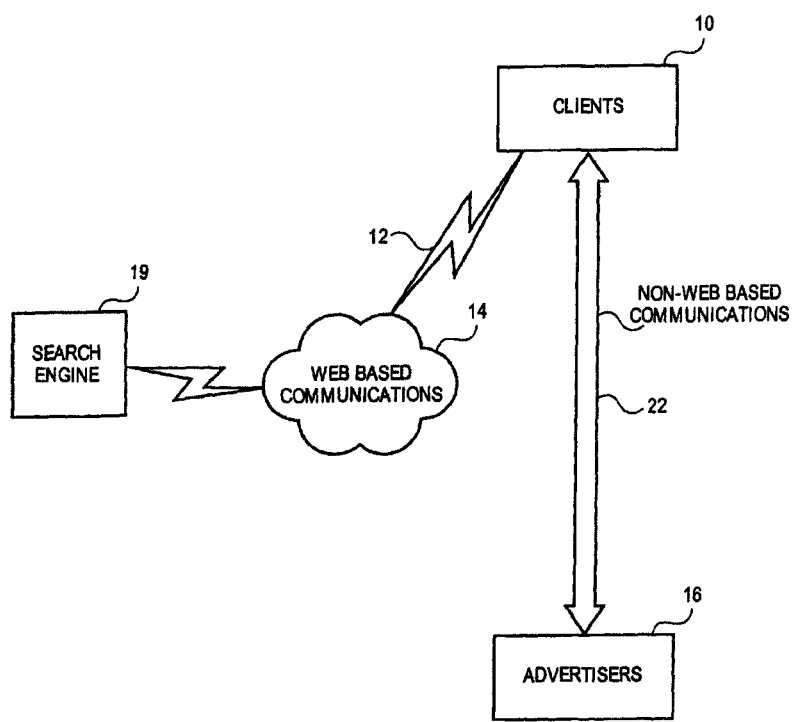
FIG. 2 shows an interaction between clients and advertisers, in accordance with one embodiment of the present invention.

Referring now to FIG. 2 of the drawings, a method for allowing advertisers to participate in a pay per call advertising program, without requiring that the advertisers have a web presence, in accordance with one embodiment, is illustrated. As will be seen, the clients 10 are coupled to the WAN 14 via the communications path 12, as before. However, the communications path 18 between the advertisers 16 and the WAN 14 is purely optional. In other words, the techniques of the present invention, allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages 20. Instead, in accordance with the techniques disclosed herein, an alternative non-web based communications path 22 is provided between the clients 10 and the advertisers 16. According to embodiments of the present invention, the non-web based communications path 22 may be provided by a conventional telephone network. Alternatively, the non-web based communications path 22 may utilize Voice Over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, etc.

Figure 3:
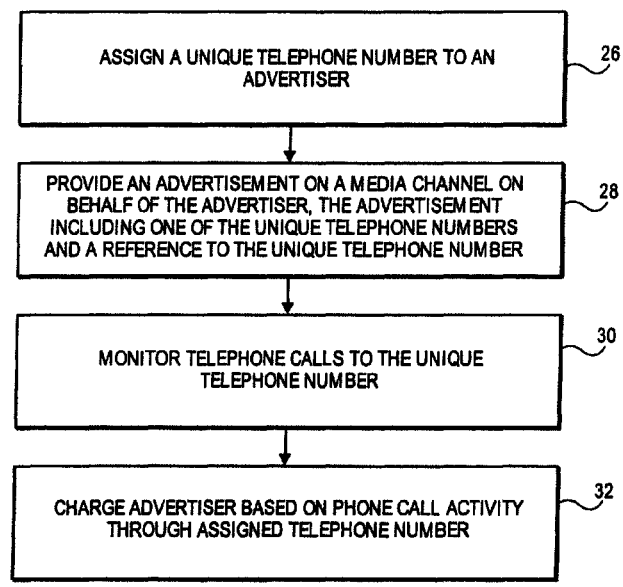
FIG. 3 shows a flowchart of operations performed in accordance with one embodiment of the present invention.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Figure 4:
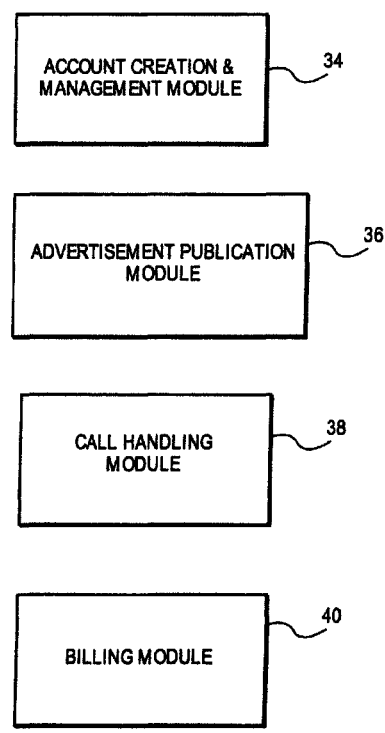
FIG. 4 shows a high level functional description of a system in accordance with one embodiment of the present invention.

FIG. 4 of the drawings shows a functional description of a system to implement the method of FIG. 3 is shown. Referring to FIG. 4, the system includes account creation and management module 34, advertisement publication module 36, call handling module 38, and billing module 40. In alternative embodiments, additional, less, or different modules may be included in the system without departing from the invention.

Figure 5:
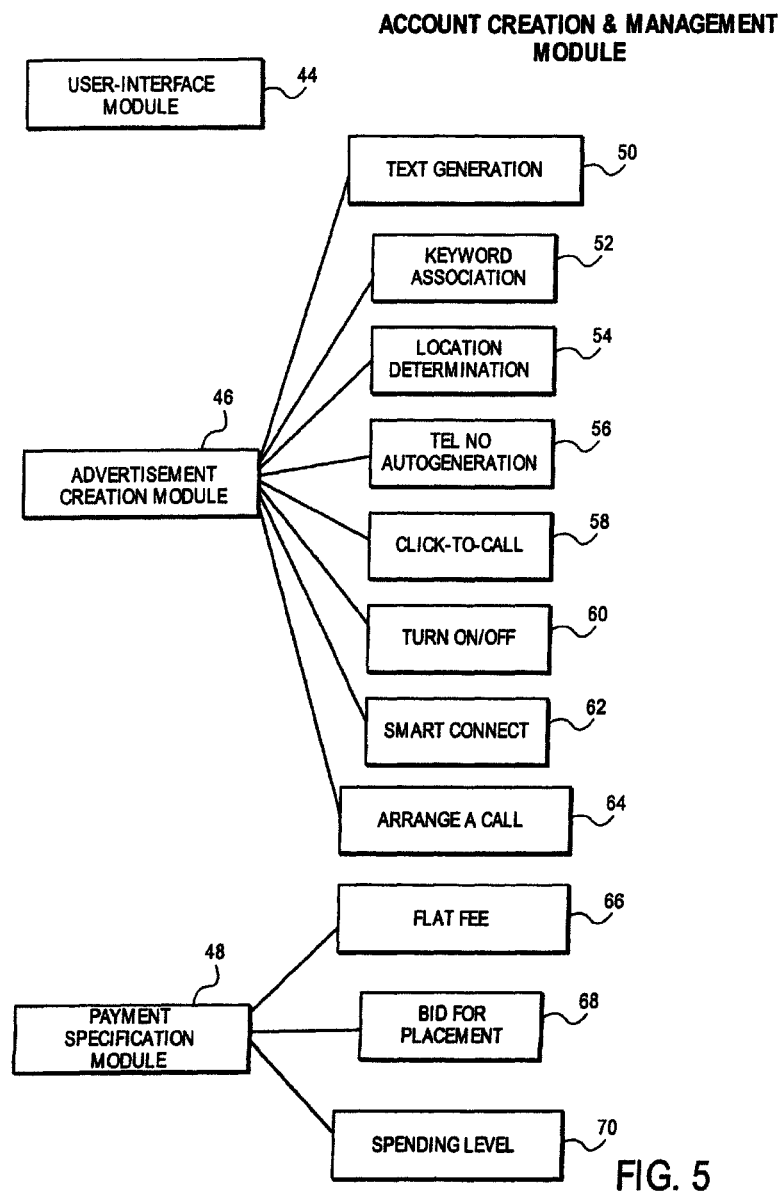
FIG. 5 illustrates the Account Creation and Management module of the system, in greater detail.
Figure 8A:
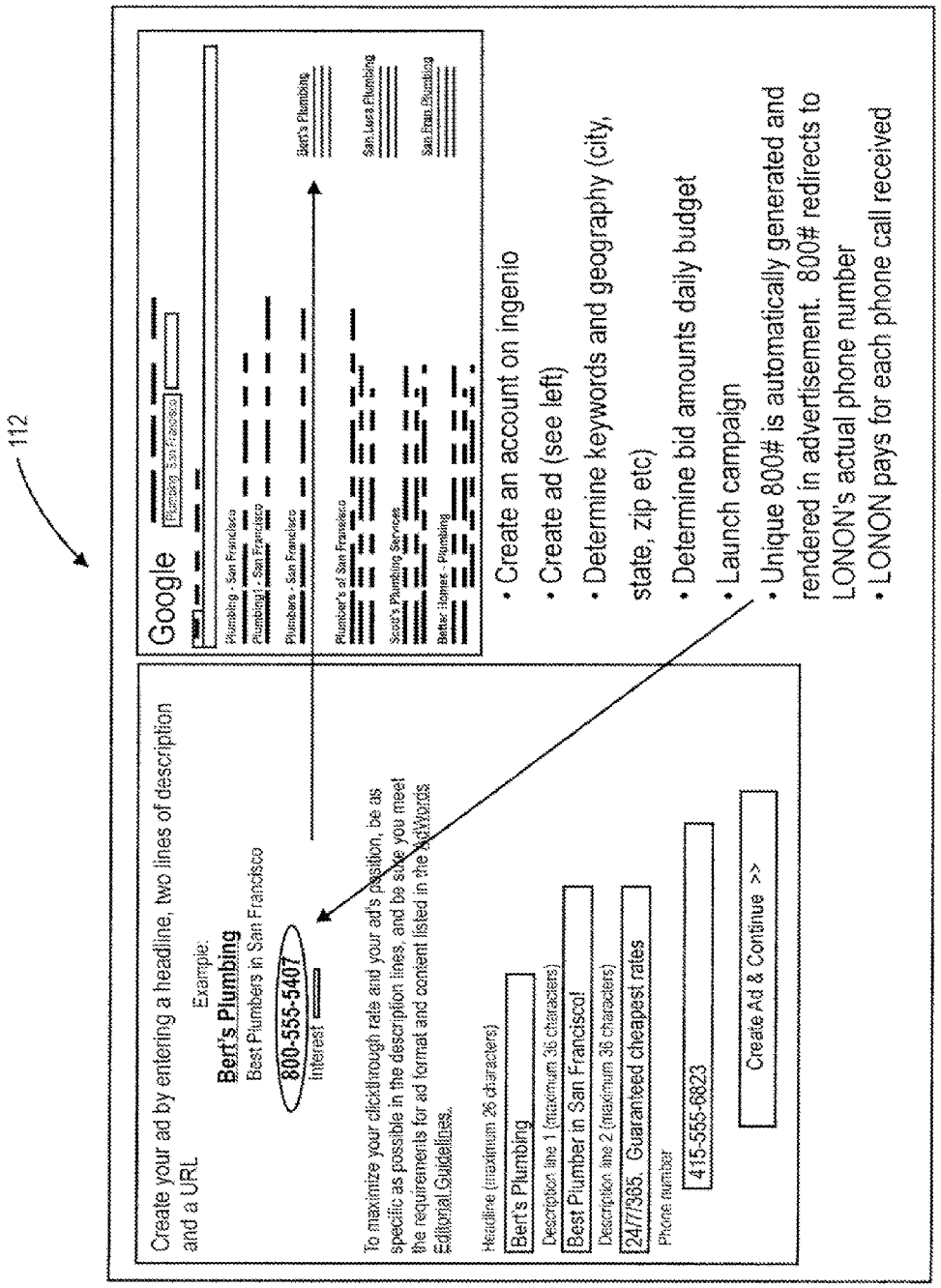
FIG. 8A shows an example of a user interface that may be presented to a user during advertisement creation, in accordance with one embodiment of the present invention.
Figure 8B:
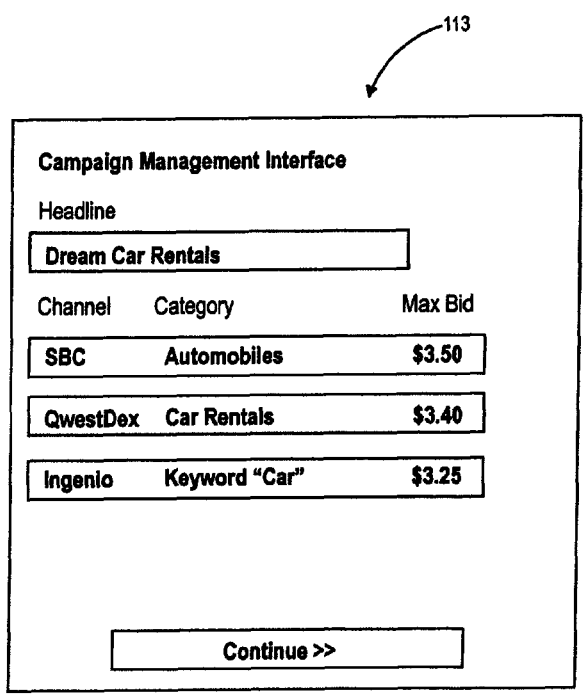
FIG. 8B shows a campaign management interface that is presented to a user, in accordance with one embodiment.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation module 46, and a payment specification module 48. The user interface module 44 includes logic to present information to a user, and to receive information from the user. For example, in one embodiment, the user interface module 44 causes a web page such as the web page 112 of FIG. 8 to be displayed on a browser of a client.

The advertisement creation module 46 includes text creation logic 50. The purpose of text creation logic 50 is to allow an advertiser 16, or an agent working on behalf of an advertiser 16, to input text for an advertisement which is ultimately created by the advertisement creation module 46. In order to enhance understanding of the present invention, for the remainder of this description, a local business enterprise called "Burt's Plumbing" will be used as an example of an advertiser that may benefit from the techniques disclosed herein. Burt's Plumbing may or not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. The idea here is that when one of the clients 10 initiates a search through the search engine 19 using a key word that matches one of the key words entered by Burt, then Burt's advertisement will be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement will only be displayed to clients within the San Francisco area.

The module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number that is automatically generated, may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1-800-YEL-PAGES-1234, the call will be automatically routed to Burt's telephone as will be described in more detail below.

In one embodiment, the advertisement creation module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

The module 46 also includes on/off logic 60 that allows Burt, to selectively turn on or turn off an advertisement. Alternatively, the turn on/off logic 60 allows Burt to assign an active or an inactive status to a particular advertisement. When an advertisement is turned off or flagged as inactive, it is considered withdrawn, at least temporarily, from an advertisement campaign, and is therefore not made published e.g. through the search engine 19. Alternatively, only advertisements that are turned on, or have a status of "active" are published in accordance with the techniques disclosed herein.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation module without departing from the invention.

The payment specification module 48, allows Burt to select a particular model and various parameters associated with billing. The module 48 includes flat fee logic 66 that presents an option to Burt through the user interface module 44, which if selected will cause Burt to be billed on a flat fee basis for each telephone call received within a particular category, or subcategory. The module 48 also includes bid for placement logic 68, that, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement will be automatically flagged as inactive or turned off, for the remainder of the time period. Burt is notified of this activity by the system and Burt is given the option of reactivating his advertisement by adding additional funds to his account.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. In one embodiment, the system of the present invention may be configured to waive the charges on leads from customers who have already called a particular advertiser within a specified number of days. In alternative embodiments, additional, less, or different logic may be included in the without departing from the invention.

Figure 6:
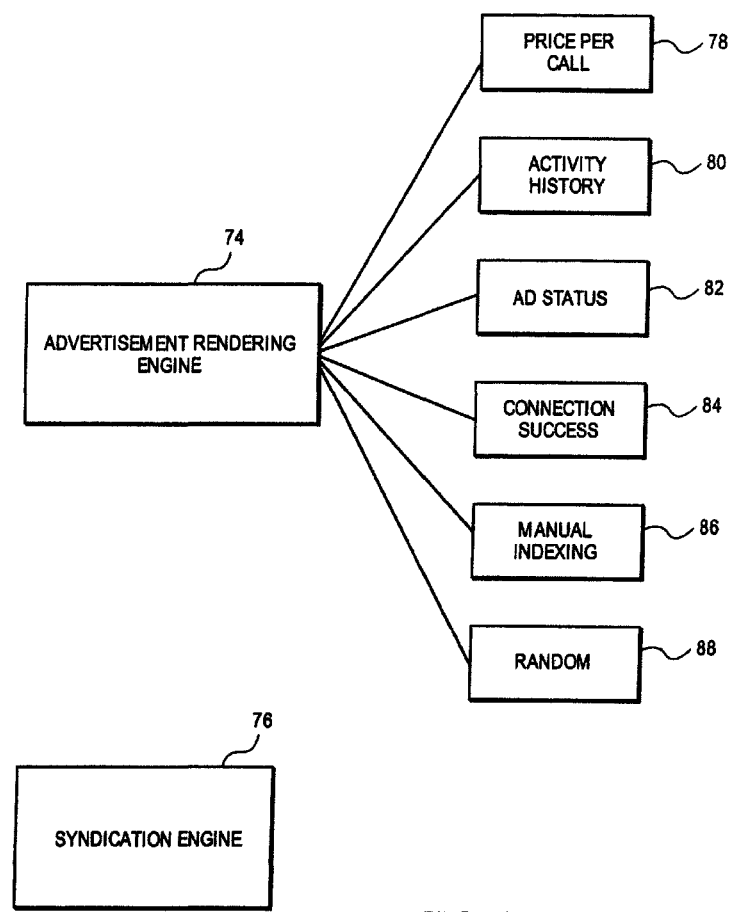
FIG. 6 illustrates the Advertisement Publication Module of the system, in greater detail.

Referring now to FIG. 6 of the drawings, the components of the advertisement publication module 36, are shown in greater detail. As will be seen, the module 36 includes an advertisement rendering engine 74, and an advertisement syndication engine 76. The purpose of the advertisement rendering engine 74 is to automatically render Burt's advertisement on a particular channel. In some embodiments, the advertisement rendering engine 74 causes a campaign management interface 113 (see FIG. 8B of the drawings) to be displayed to an advertiser. The interface 113 allows the advertiser to choose a channel, e.g., SBC, QwestDex, Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system of the present invention.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement rendering engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately rendered. The price per call logic 78 causes Burt's advertisement to be published on a price per call basis. Thus, for example, if Burt is willing only to pay a low amount for each call, then his advertisement will be placed or ranked low down within a search result page or category of advertisers. Alternatively, if Burt is willing to pay a high price per call, then his advertisement will be placed higher up in the search result page or category of advertisers. The table below shows how the price per call logic 78 would rank or place advertisers within a channel based on a bid amount per call that an advertiser is willing to pay:

| Placement | Advertiser | (Bid Amount per call) |
|---|---|---|
| 1 | 800-349-2398 | ($3.88) |
| 2 | 866-324-3242 | ($3.22) |
| 3 | 800-323-5321 | ($2.01) |

The activity history logic 80 analyzes the number of calls Burt received in a given time period, for example, the last day/week/month, and will rank Burt's advertisement within a display page based on the activity history. The call status logic 82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 will cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88, which may be dictated by a third party who employs the system. In alternative embodiments, additional, less, or different logic may be included in the advertisement rendering engine 74 without departing from the invention.

Figure 7:
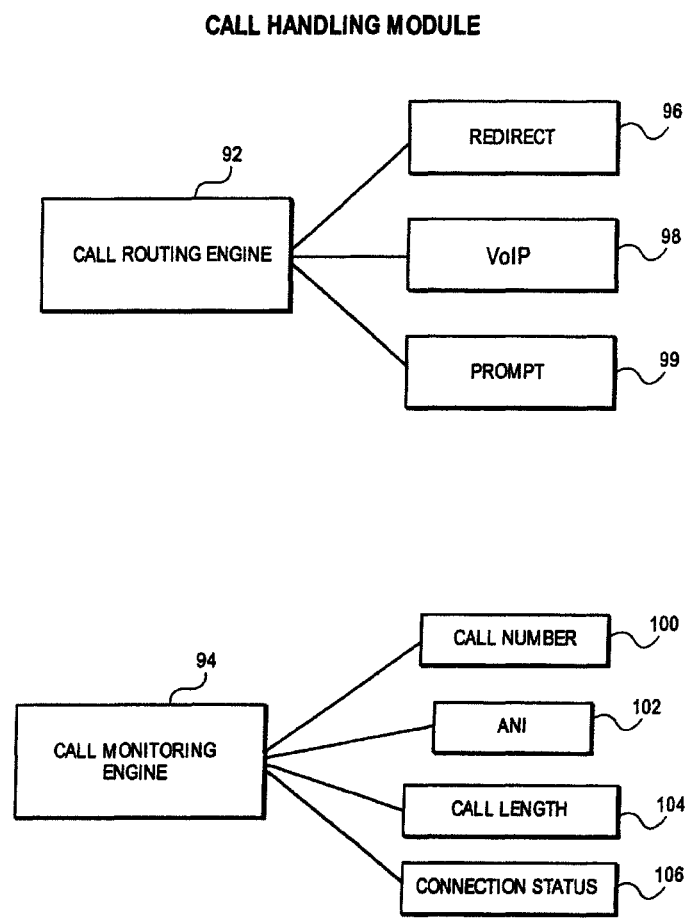
FIG. 7 illustrates the Call Handling Module of the system, in greater detail.

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation module 46. The call routing engine 92 also includes VoIP logic 98 to route a telephone call to or from a client to a telephone number specified by Burt in the advertisement using VoIP technology.

Figure 10:
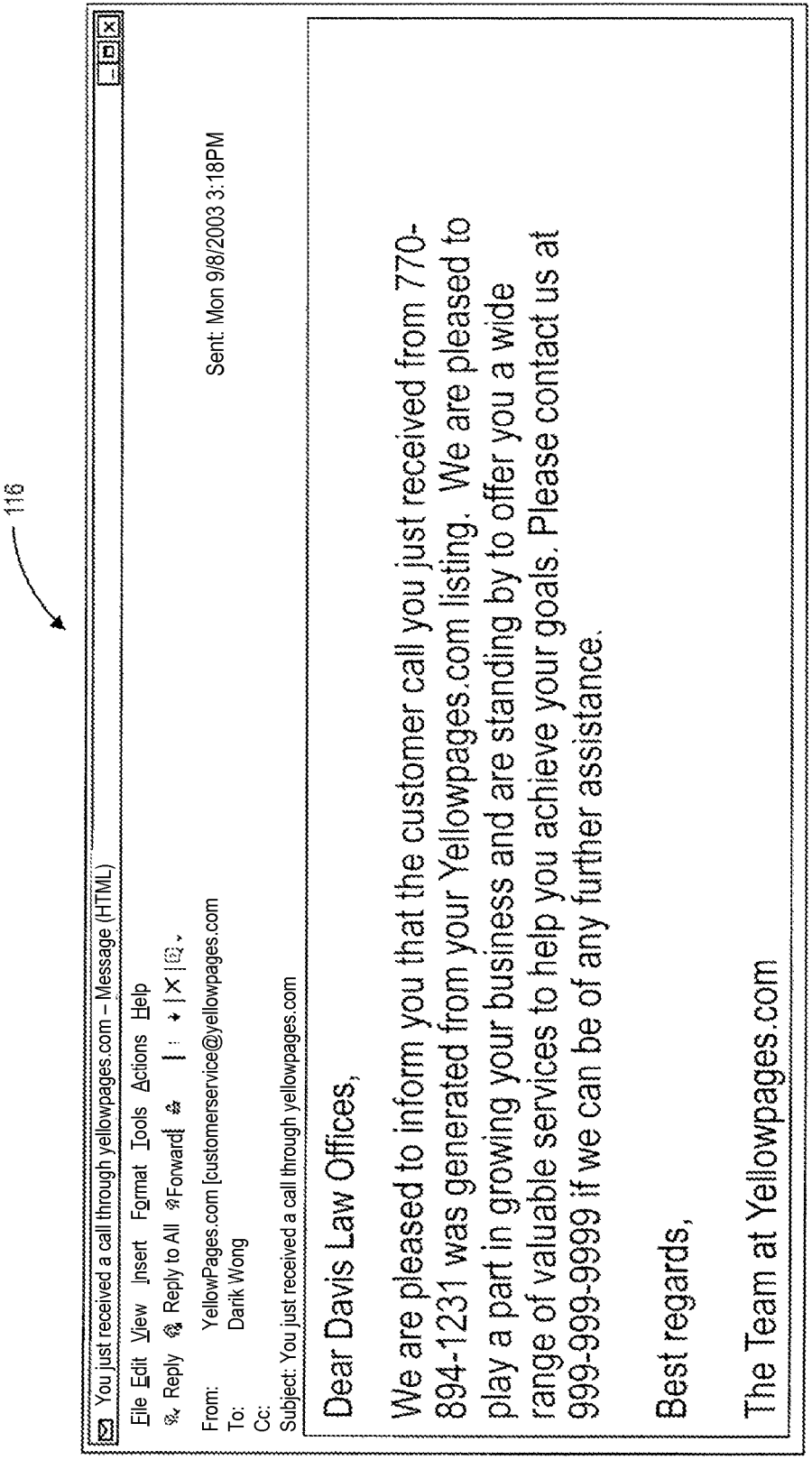
FIG. 10 shows an example of an email alert that is sent to an advertiser, when a call is generated, in accordance with one embodiment of the invention.

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92 without departing from the invention.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100-106, a report is compiled and may be viewed by Burt. In one embodiment, the report includes a number of calls, the number of calls from unique telephone numbers, the telephone numbers of the callers, the length of each call, and the number of calls that were successful, for which an engaged to new as returned, or that went unanswered. The report may be used by Burt in order to monitor the effectiveness of an advertisement campaign, and to optimize the campaign. In alternative embodiments, additional, less, or different logic may be included in the call monitoring engine 94 without departing from the invention.

In one embodiment, the advertising publication module may publish the advertisement on a telephone-based advertising service. For example, the advertisement can be delivered to a consumer through audio as part of a voice portal or telephone-based directory such as a 411 telephone directory.

Figure 11:
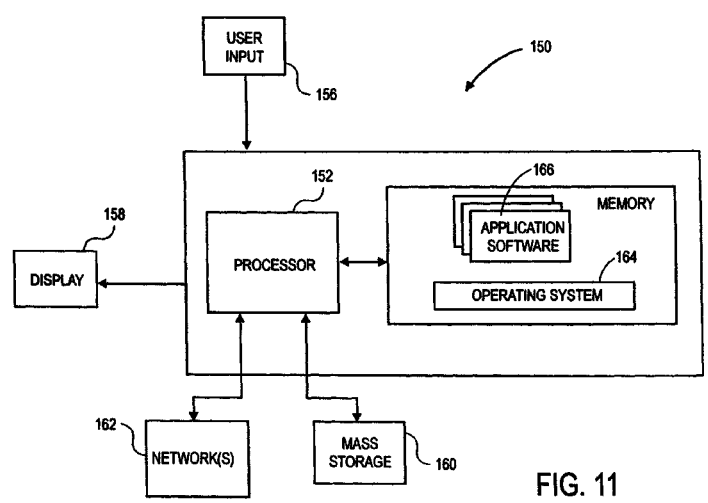
FIG. 11 shows a high level hardware block diagram of a system that may be used to implement the system, in accordance with one embodiment of the invention.

Referring to FIG. 11 of the drawings, reference numeral 150 generally indicates hardware that may be used to implement the above-described system. The hardware 150 typically includes at least one processor 152 coupled to a memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or backup memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

As discussed above, the syndicate engine 76 is used to syndicate Burt's advertisement to a number of third parties. Additional examples of third parties include companies such as Yahoo!®, MSN®, AOL®, and other similar demand partners. Often times, these demand partners (also referred to herein as syndication partners) receive a percentage of the advertising revenue generated via the pay-per-call method and system described, herein. Thus, as in the example of the table above, the advertiser of placement 1 pays $3.88 per call received to phone number 800-349-2398. Now suppose the call to the advertiser of placement 1, resulted from an advertisement presented on a demand partner's website. The demand partner would be entitled to a percentage of that $3.88. The present method and system offers multiple embodiments for tracking, monitoring, and determining demand partner compensation.

Figure 12:
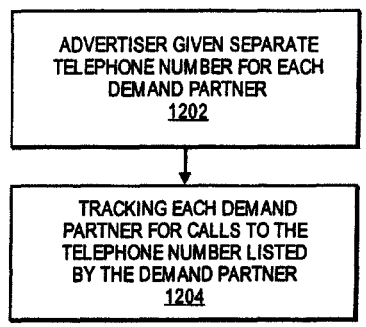
FIGS. 12-18 describe processes in accordance with embodiments of the invention to track/credit demand partners.

In one embodiment, described in the flow diagram of FIG. 12, in process 1202 an advertiser (also referred to herein as a merchant or listing) is given a separate telephone number for each separate demand partner that is posting the merchant's advertisement using. As described herein, in multiple embodiments, telephonic references, including telephone numbers and telephone extensions corresponding to a base telephone number, are assigned using the telephone number auto generation logic 56.

In one embodiment, the alias phone number is mapped to the advertiser's actual phone number, and calls made to the alias are monitored in order to track the respective demand partners. Therefore, in process 1204 billing module 40 tracks and/or credits demand partners a percentage of the revenue charged to the advertiser (or collected from the advertiser) for calls placed to the advertiser's alias telephone number corresponding to the respective demand partner.

Figure 13:
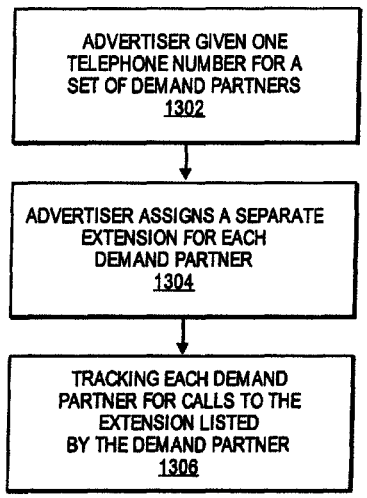

In another embodiment, described in the flow diagram of FIG. 13, in process 1302 an advertiser receives a single/base (the same) telephone number for a set of the demand partners. In process 1304, a separate extension is assigned to the advertiser for each of the separate demand partners. More specifically, the separate demand partners list the same telephone number for the advertiser, but also include an extension unique to the respective demand partner. For example, a listing could have the number "(800) new-cars" for the set of demand partners, but each demand partner posting the common telephone number for the advertiser would also provide a separate extension corresponding to the respective demand partner (e.g., ext. 102 corresponding to the XYZ syndication partner, ext. 104 corresponding to the ABC syndication partner, etc.) In process 1306, billing module 40 tracks and/or credits a demand partner a percentage of the revenue charged to the advertiser (or collected from the advertiser), for calls placed to the advertiser via the telephone extension corresponding to the respective demand partner.

Figure 14:
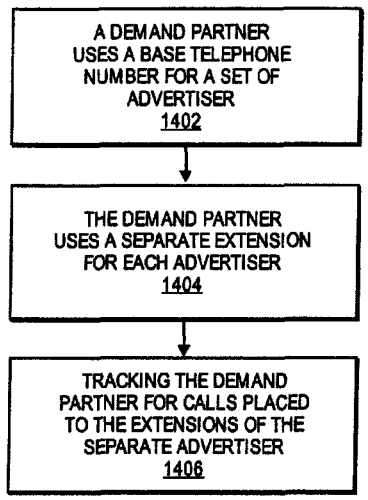

In an alternative embodiment, described in the flow diagram of FIG. 14, in process 1402 a demand partner uses a base telephone (i.e., a single) number for a set of advertisers. In process 1404, the demand partner provides a separate extension to each of the advertisers using the same base number. For example, the demand partner could use the telephone number (800) Call XYZ for a set of advertisers, and provide the extension 102 for Joe's plumbing, and extension 104 for Carl's plumbing, etc. In process 1406, billing module 40 tracks and/or credits a demand partner a percentage of the revenue charged to the advertiser (or collected from the advertiser), for calls placed to the advertiser via the base telephone number corresponding to the respective demand partner and the unique telephone extension assigned to the advertiser at the respective demand partner.

Figure 15:
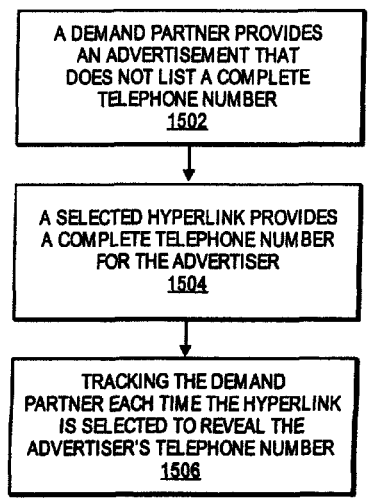

According to another embodiment, a click-to-reveal method is proposed, as described in Provisional U.S. Patent Application Ser. No. 60/552,124, entitled "A Method and Apparatus to Provide Pay-Per-Call Performance Based Advertising and Billing" filed on Mar. 10, 2004, herein incorporated by reference. As described in the flow diagram of FIG. 15, in process 1502 a user is presented with an advertisement via a demand partner's website. The advertisement does not show the advertiser's complete phone number, but instead contains a hyperlink to reveal the advertiser's phone number, or the remaining portion of the telephone number. In process 1504, the Advertisement rendering engine 74 monitors the number of click-throughs to reveal the advertiser's number. In one embodiment, it is assumed that each click-through from a demand partner results in a call to the respective advertiser. As a result, in process 1506 billing module 40 tracks and/or calculates an amount to credit a demand partner based at least in part on a number of click-throughs to reveal an advertiser's telephone number.

Figure 16:
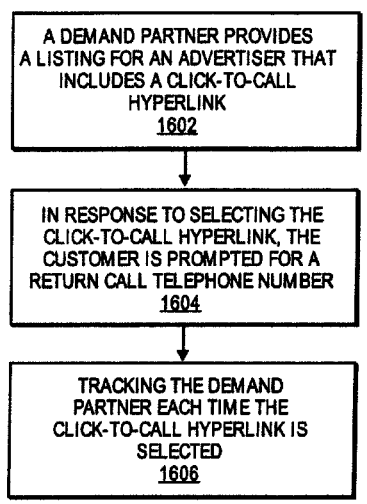

In yet another alternative embodiment, a demand partner is provided with a click to call format. In one embodiment, as described in the flow diagram of FIG. 16, in process 1602 in addition to listing a telephone number for an advertiser (or in place of listing a telephone number for the advertiser) a link is provided by the demand partner to initiate establishing a telephone connection between the viewer/customer and the advertiser in response to the viewer/customer activating/selecting the hyperlink provided. In one embodiment, in process 1604, in response to activating/selecting the hyperlink provided, the viewer/customer is prompted for their telephone number to establish the telephone connection with the advertiser. After the customer enters their telephone number, a telephone connection is established between the customer and the advertiser.

In yet another embodiment, if the viewer/customer has a VoIP communications device, VoIP logic 98 may connect the advertiser to the viewer/customer without the need for the customer/viewer to provide their telephone number. The VoIP communications device includes telephony devices attached to the user's computer, as well as mobile communication devices, such as PDA's and cellular phones.

In the embodiment employing a click to call (for PSTN and VoIP connections), in process 1604, a demand partner providing the click to call option would be tracked/credited (i.e., a percentage of the charge to the advertiser) each time a viewer/customer selects/activates a click to call icon for the respective advertiser.

Figure 17:
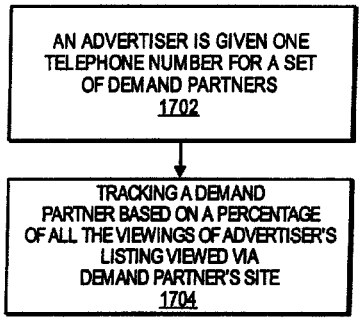

In another embodiment, described in the flow diagram of FIG. 17, in process 1702 an advertiser is given one telephone number for a set of demand partners. In process 1704, credits to the demand partners for calls placed to the advertiser's listed telephone number are prorated based on a number of page views for the advertiser's telephone number listing via the respective demand partners. For example, if 70% of the advertiser's page views are accessed via demand partner ABC, and 30% of the advertiser's page views are accessed via demand partner XYZ, the ABC demand partner would receive 70% and the demand partner XYZ would receive 30% of the credits payable to the demand partners for calls placed to the advertiser's listed telephone number.

Figure 18:
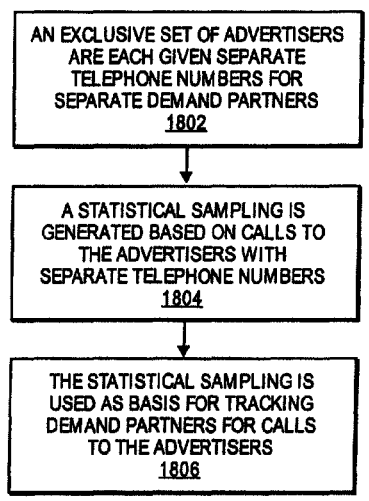

In another embodiment, described in the flow diagram of FIG. 18, in process 1802 at least a first set of advertisers are given unique telephonic reference for each demand partner. One or more advertisers are each given one telephonic reference for a set demand partners.

In process 1804, a statistical sampling of calls to advertisers with the unique telephonic reference is generated. In one embodiment, the statistical sampling represents a sampling of a percentage of calls to an advertiser (or set of advertisers) that originate from an advertisement listed by a first demand partner compared to calls that originate from the same (or similar) advertisement listed by other demand partners. In one embodiment, the samplings may be separated based on a category of advertisers (e.g., restaurants, automobiles, etc.).

In process 1806, the samplings are used as a basis for tracking/crediting the demand partners with a percentage of the charges to at least a set of the advertisers. Consider the example advertisers 1 and 2 are given each give unique telephone, and 70% of the calls to advertisers 1 and 2 are from telephonic references listed by partner ABC. Given the example, an assumption is made that 70% of the calls to the advertisers using a common number among the demand partners, are originated from advertisements listed by partner ABC.

Therefore, in one embodiment, based on the statistical sampling, partner ABC would be credited for 70% of the calls placed to the advertisers using a common number among the demand partners. In one embodiment, tracking/crediting the demand partners based on the statistical sampling could also be applied to the advertisers using unique numbers among the demand partners.

As described above, telephone-call tracking is used to determine the number of phone calls a particular party, or directory, has received. It can be useful for a variety of purposes. It is particularly useful in measuring the success of advertising. For instance, a telephone directory may offer advertising placements to its advertisers, such as plumbers. By tracking the number of phone calls a particular advertisement has received, the directory can demonstrate the value of its advertising to the advertiser.

Telephone-call tracking can be used to measure the effectiveness of a variety of advertising vehicles in addition to the physical yellow-pages phone book. Newspaper classifieds can utilize call tracking, as can television commercials that display phone numbers for consumers to call. By counting the number of telephone calls such advertisements receive, the campaign's effectiveness can be measured. This is of benefit both to the advertiser and to the directory.

Telephone-call tracking can be also used as such in directories that are online, such as an online yellow pages. Similarly, it can be used to track the success of online search advertising, such as keyword advertising.

Telephone-call tracking is particularly useful in pay-for-performance advertising systems, as described in several embodiments above. In pay-for-performance systems, advertisers pay when an advertisement performs. For instance, an advertiser can pay $1 each time a potential customer clicks on an online-search advertisement. Similarly, in pay-per-call advertising systems, such as that covered in U.S. patent application Ser. No. 10/872,117, an advertiser's payments are linked to the number of calls that advertiser receives. In such a pay per call advertising system, call tracking is vital, since counting the number of calls received determines the amount that the advertiser must pay. In one embodiment, not only are the number of calls received counted but also the time of the call, since in one embodiment an advertiser may bid to pay a higher price per call in order to receive a more prominent placement for their advertisement.

Not only is it important to track the number of calls and precise time of calls, but the demand source at which the caller viewed the advertisement may also be tracked. Online directories can have many different external web sites through which they syndicate the same advertisers, and it is important to know from which web site the phone call originated so that, in some cases, the directory can compensate the external web site for having brought customers. Provisional U.S. Patent Application Ser. No. 60/560,926 outlines this case.

Tracking phone calls may include publishing a unique phone number that is different from the advertiser's standard phone number. When a caller views the advertisement, the unique phone number appears, and the caller dials it. The call coming in on the unique phone number is then rerouted, using the call tracker's telephony equipment, to the advertiser's standard phone number. In addition to rerouting the call, the call tracker also records that a call was made and the precise time of the call. In a pay-per-call advertising system, this information can be used to bill the advertiser for the call.

In cases where directories would also like to identify the demand source of the call, a single advertiser will have to be given multiple unique phone numbers, one for each demand source where that advertiser appears. For instance, the advertisement of a single plumber might be displayed in two different online directories and three different online search engines. In order to track which of these demand sources produced a call from a customer, the single plumber would have to be assigned five different unique telephone numbers. By monitoring which unique phone number was dialed, it can be determined which demand source deserves the credit for producing the call.

Figure 19:
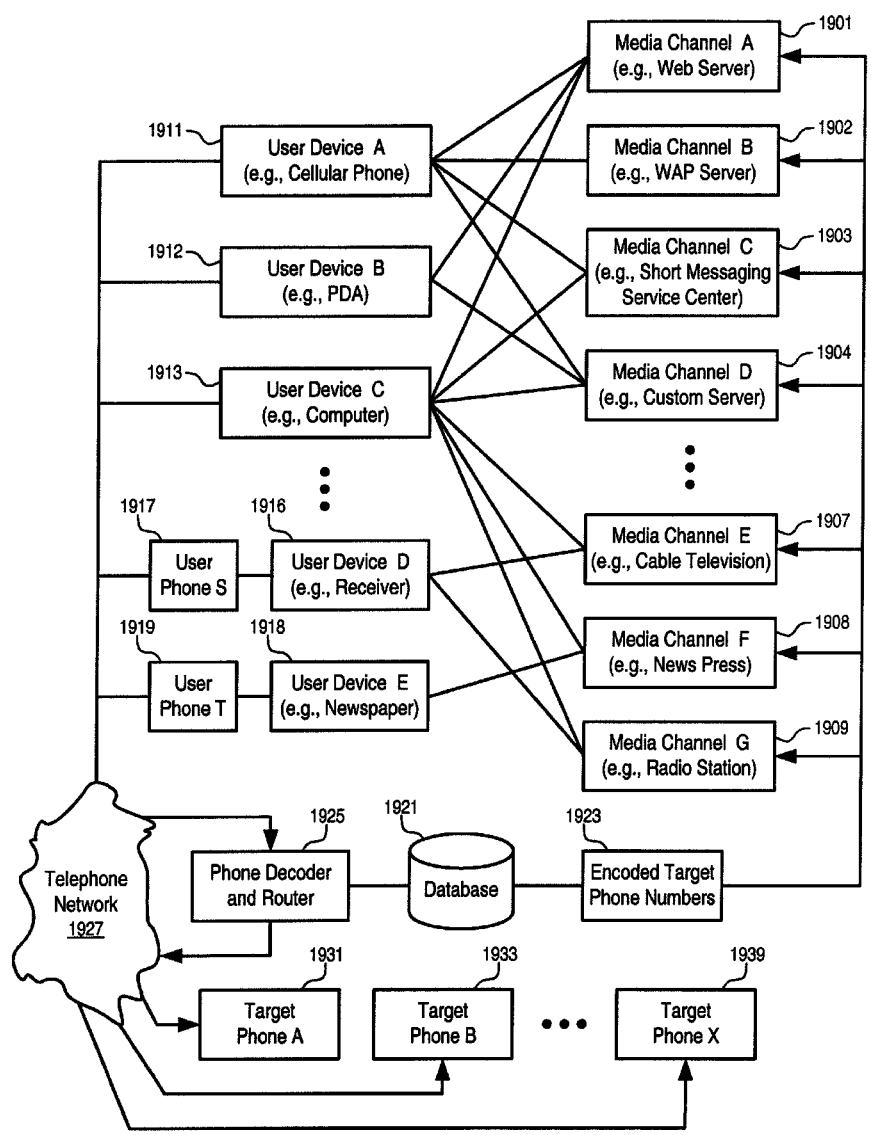
FIG. 19 shows a diagram of a system to make and track phone connections according to one embodiment of the present invention.

FIG. 19 shows a diagram of a system to make and track phone connections according to one embodiment of the present invention.

In FIG. 19, a database 1921 may contain the phone numbers of target phone A 1931, target phone B 1933, . . . , target phone X 1939, etc. Typically, the target phones belong to the institutions, businesses, individuals, etc, which seek for publicity through various media channels, such as media channel A 1901 (e.g., web server), media channel B 1902 (e.g., WAP server), media channel C 1903 (e.g., short messaging service center), media channel D 1904 (e.g., custom server), media channel E 1907 (e.g., cable television), media channel E 1908 (e.g., news press), media channel G 1909 (e.g., radio station), etc.

In one embodiment of the present invention, the phone numbers of the target phones are not directly publicized over the media channels. Instead, encoded target phone numbers 1923 are used. Using the encoded target phone numbers 1923, a user cannot reach target phones directly. The encoded target phone numbers 1923 allow the association of additional information with the target phone numbers, such as the media channels used, special promotions, etc.

The encoded target phone numbers are delivered with content information (e.g., web page, WAP page, short message, television programs, news articles, etc.) to user devices, such as user device A 1911 (e.g., cellular phone), user device B 1912 (e.g., personal digital assistant (PDA)), user device C 1913 (e.g., computer), user device D 1916 (e.g., receiver), user device E 1918 (e.g., newspaper).

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, a SMSC, etc.).

In one embodiment, a user device is capable to dial a phone call (e.g., automatically according to the encoded phone number embedded in the content information when a user selects the number). Alternatively, a user may manually dial a phone call using a separate phone, such as user phone S 1917 or user phone T 1919.

In one embodiment of the present invention, dialing at least a portion of an encoded target phone number connects the phone call to a phone decoder and router 1925 first. According to the encoded target phone number dialed, the phone decoder and router 1925 determines the corresponding target phone number using the database 1921 and connects the phone call to the corresponding target phone (e.g., one of target phones 1931-1939) through the telephone network 1927.

Note the telephone network 1927 may be circuit switched, package switched, or partially circuit switched and partially package switched. For example, the telephone network may partially use the Internet to carry the phone call (e.g., through VoIP). For example, the connection between the user phone/device and the phone decoder and router 1925 may be carried using VoIP; and the connection between the phone decoder and router 1925 may be carried using a land-line based, circuit switched telephone network.

In one embodiment of the present invention, the information associated with the encoded target phone number, such as the media channel used to provide the encoded target phone number to the users, is also decoded/retrieved using the database 1921. Thus, the information associated with the encoded target phone number can be tracked/stored.

In one embodiment, the phone decoder and router 1925 also determines the phone number of the user through Automatic Number Identification (ANT). ANI is a phone system feature that provides the billing number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment of the present invention, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router 1925. In such an arrangement, a large number of encoded phone numbers are generally required to differentiate the different target phones and different media channels.

In one embodiment of the present invention, an encoded target phone number has more digits than a standard phone number. A first portion of the encoded target phone number has the same number of digits as a standard phone number to reach the phone decoder and router 1925 through the telephone network 1927; and a second portion of the encoded target phone number is to be decoded by the phone decoder and router 1925. For example, the Dual Tone MultiFrequency (DTMF) decoder can be installed in the phone decoder and router 1925 to detect the second portion of the encoded target phone number dialed at the user phone. The detected phone number can then be used to recover the target phone number.

When an encoded target phone number has more digits than a standard phone number, the additional digits can be implemented as a telephone extension, or as an IVR system.

In one embodiment of the present invention, a single telephone number is used to reach the phone decoder and router 1925 for different target phone numbers; and the portion of the encoded target phone number that is used to reach the phone decoder and router 1925 is not used in determining the information associated with the encoded target phone number.

Alternatively, multiple telephone numbers can be used to reach the phone decoder and router 1925; and the entire encoded target phone number can be used to determine the information associated with the encoded target phone number.

In one embodiment of the present invention, the encoded target phone numbers can have different numbers of digits. The advertisers may be arranged to bid for shorter encoded target phone numbers.

In one embodiment of the present invention, the encoded target phone numbers are assigned only when needed for use in a media channel.

In one embodiment, a look-up table approach is used to encode the information. For example, the database 1921 keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of field separated by "*" or "#". Each of the field can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router 1925. When such a mapping scheme is used, a look up table is not necessary. For example, an encoded target phone number may include a first portion that is the phone number of the phone decoder and router 1925, a second portion that is the target phone number appended with a number mapped from an identifier of the media channel. To prevent the user from dialing the target phone number directly, an encryption/scrambling scheme can be used to encode the second portion, which is decoded at the phone decoder and router 1925.

In one embodiment of the present invention, the phone decoder and router 1925 determines the target phone number from the encoded target phone number dialed by the user and then dials the target phone number for the user and joins the phone calls so that the user can talk to the target phone.

In one embodiment of the present invention, users dial the encoded target phone numbers manually. A user can dial the encoded target phone number regardless the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment of the present invention, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router 1925, pauses for a short period of time for the phone decoder and router 1925 to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 19, the user device initiates the phone call. Alternatively, a phone router may be used to initiate phone calls both to the user device (or a separate user phone) and the target phone and then join the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

In one embodiment of the present invention, an advertisement presented in a media channel is for a single advertiser. The end user selects an advertiser according to the advertisements presented on behalf of individual advertisers; and the phone decoder and router connects the end user and the selected advertiser according to the encoded target phone number individually publicized in the advertisement for the advertiser. When the user views the online advertisements, the selection of the advertiser is based on the online information.

In one embodiment of the present invention, an advertisement is presented in a media channel for a group of advertisers, such as a group of mortgage brokers. The advertisement contains an encoded target phone number which is reachable to the group of mortgage brokers. When the encode target phone number is selected or used, the selection of a particular advertiser is performed at the phone decoder and router.

For example, a toll-free number is published to advertise mortgage brokers in a particular geographic area. When a consumer dials the toll-free number, the call is routed to the highest bidding mortgage broker who is available in that market.

The phone decoder and router may select the target advertiser according to the bidding of the advertisers for the advertisement. The advertiser who places the highest bid is the winner for the call. Alternative, or in combination, other types of selection criteria can also be used. For example, the user may be interested in advertisers in a particular geographical region; and the geographical area of interest to the caller can be determined and used in selecting the target advertiser. Further, the user may be interested in a connection without excessive waiting time. The status of the availability of the advertisers to answer the call can be used in ranking the candidates for routing the call.

In general, an indicator used to rank the candidates may be a function of a number of parameters, such as the bid for the advertisement, the projected waiting time, an indicator showing a degree of matching to one or more user requirements (e.g., geographic area, service type, etc.), advertisement budget, and others. Further details are provided below.

Offline Selection Examples

Figure 20:
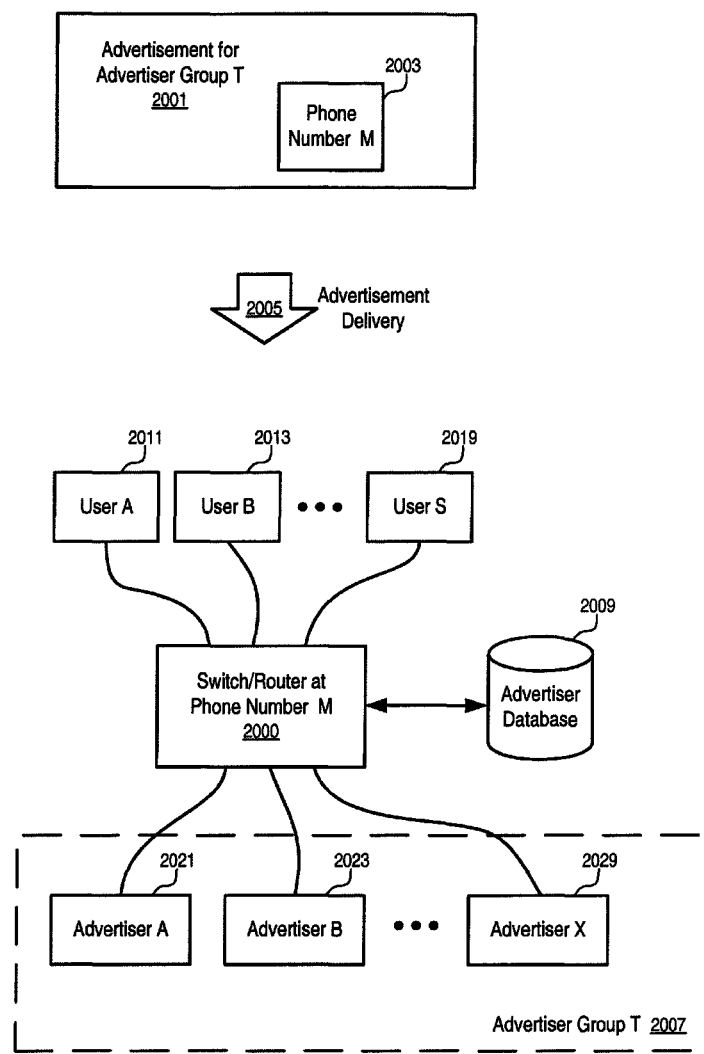
FIG. 20 shows a diagram of a system to make offline selection of advertisers according to one embodiment of the present invention.

FIG. 20 shows a diagram of a system to make offline selection of advertisers according to one embodiment of the present invention.

In FIG. 20, the advertisement 2001 is for an advertiser group T 2007 which includes a number of different advertisers, such as advertiser A 2021, advertiser B 2023, advertiser X 2029, etc. For example, the advertisers of the group may offer the same types of services or products under similar terms and/or prices. Thus, a unified advertisement can be presented on behalf of the entire group. The advertisement delivery 2005 can be in any of the forms known in the art. For example, the advertisement can be delivered through newspaper, radio, television, yellow book, listing sendee, web search engine, web site banner, WAP, SMS, etc. The advertisement contains phone number M 2003 for the users to initiate a phone call to reach one of the advertisers.

In one embodiment, the advertised phone number (e.g., 2003) can also contain extension digits in addition to toll-free digits. In one embodiment, the extension digits are used to convey additional information such as geography, category, or the ability to trace specific advertising creative (e.g., the call resulted from the advertisement on the billboard on Second Street). In one embodiment, dialing of the extension digits (or some of the extension digits) is optional; if the extension digits are not dialed, the call goes through anyway; and the information corresponding to the extension digits is not collected (or, similar information is extracted/extrapolated from other data sources, such as the phone number from which the call is initiated, etc.).

In one embodiment of the present invention, the phone number M 2003 is not specifically for a particular advertiser at the time the advertisement is presented. Thus, at the time the user initiates the phone call, the target advertiser is yet to be determined. The selection of a particular target advertiser is after the initiation of the phone call.

In one embodiment of the present invention, a switch/router 2000 at the phone number M is used to connect the users to the advertisers dynamically according to the information in the advertiser database 2009. When a user, such as user A 2011, user B 2013, user S 2019, etc., calls the phone number M 2003, the user is connected to the switch/router 2000 first. With or without further user input, the switch/router 2000 connects the call to an advertiser, such as advertiser A 2021, advertiser B 2023, advertiser X 2029, etc. The advertiser is charged based on the telephone calls generated for the advertiser. In one embodiment, the selection of the advertiser is made at the switch/router after the user phone call is received.

Alternatively, information about the user phone number and the desire to make the phone call according to the advertised phone number can be transmitted to the switch/router through a communication link other than a phone connection. For example, an email, a fax, an HTTP (HyperText Transfer Protocol)/WAP (Wireless Application Protocol) request, etc., can be used to submit the request for the phone connection. The switch/router then initiates the phone call to the user and selects the winning advertiser for the phone call.

Note that the phone number M 2003 may also be encoded in a way so that the information about the media channel which provides the phone number to the user can be decoded, as discussed above. For example, different media channels may be assigned different phone numbers for reaching the same group of advertisers through the switch/router 2000. According to the phone number in the advertisement, the switch/router 2000 can determine the media channel that is creditable for the delivery of the phone number to the users.

In one embodiment of the present invention, a winning advertiser is selected according to the bidding for advertisement. The highest bidder wins the telephone call. The advertisers may adjust their bids anytime through any communication media to balance their chances to get a call resulting from the advertisement and the cost for the advertisement. For example, the advertisers may change their bids through a web site that is connected to the advertiser database, through an email to representatives or automatic email gateways of the advertiser database, through a phone call, a fax, a letter, etc.

Alternatively, the set of highest bidders may be determined; and the calls resulting from the advertisement are distributed to the set of highest bidders in frequencies that are proportional to their bid amounts. Alternatively, one from the set of highest bidders is further selected according other criteria, such as the geographic distance from the advertisers to the callers. Alternatively, other criteria, such as the matching of geographic sendee area to the location of the callers, are used to select a set of candidates; and the candidates are then ranked according to the prices specified by the advertisers for the pay for performance advertisement, where the performance is measured in terms of phone calls resulting from the advertisement.

In one embodiment, the availability of the advertisers to answer the call is also considered. In one embodiment, if the top-ranking (e.g., according to the bidding) advertiser receives a call and doesn't pick up after a certain amount of time (e.g. 30 seconds), the call is automatically routed to the second-highest ranking advertiser, and so on. In another embodiment, the missed call is routed to a human concierge who shepherds the call to the appropriate available advertiser or information source.

In one embodiment, the advertiser group includes subgroups of advertisers for different geographic areas. Indications of geographic areas of interest to the callers can be used in the selection process.

In one embodiment, the selection of the geographic area is made when the user selects the phone number from the advertisements. The phone number is encoded with geographic area information such that, when the phone number is dialed, the geographic area information can be automatically decoded from the phone number dialed; and the geographic area information can be used to rank the advertisers and/or eliminate the advertisers that are not for the corresponding geographic areas.

In one embodiment, the geographic area information is determined from the location of the user phone. Alternatively, the user may specify the geographic area in the phone call to the switch/router 2000, through an automated system or through human concierges. Further, the user may specify requirements other than geographic areas for selecting the winning advertiser. Further details are provided below.

Figure 21:
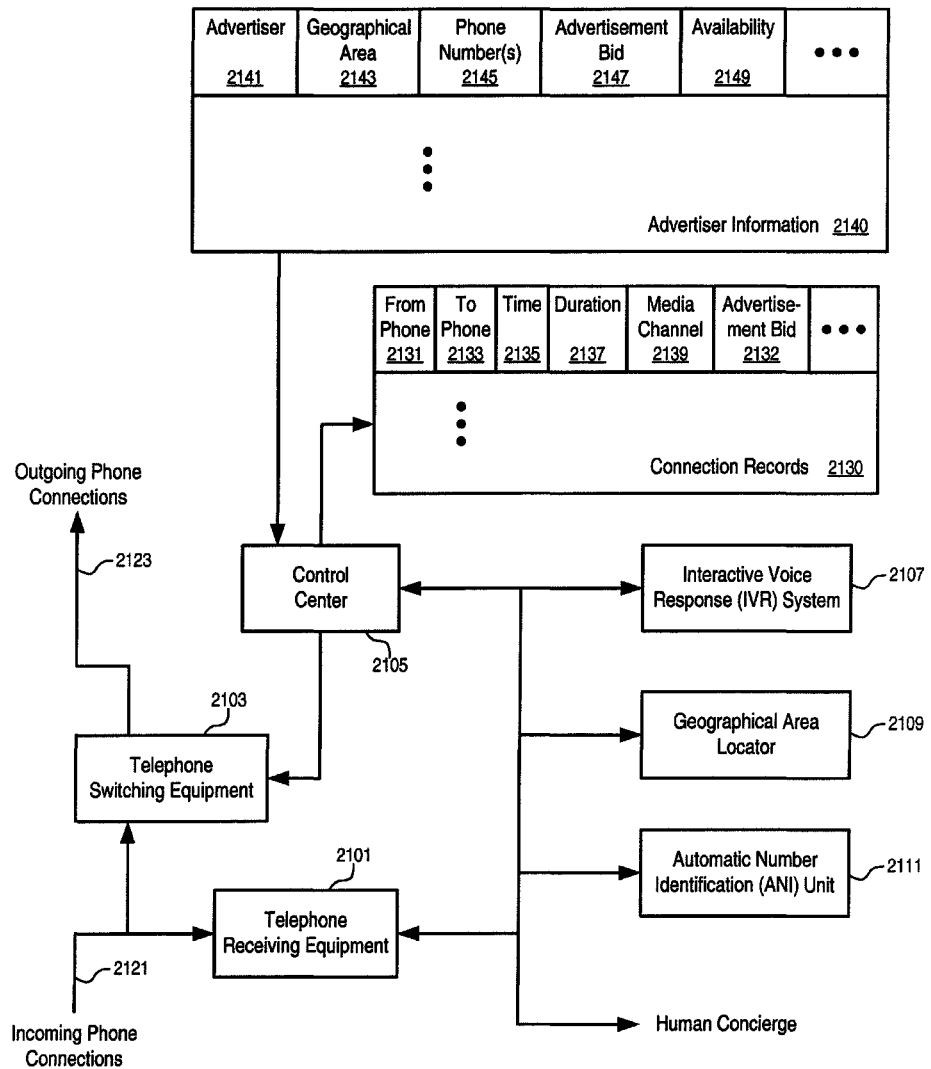
FIG. 21 shows a diagram of a telephone connection system for offline selection of advertisers according to one embodiment of the present invention.

FIG. 21 shows a diagram of a telephone connection system for offline selection of advertisers according to one embodiment of the present invention.

In FIG. 21, when a user calls an advertised telephone number, the phone call is connected to the telephone receiving equipment 2101. The telephone receiving equipment 2101 is connected to the control center 2105 to operate the telephone switching equipment 2103, which selectively connects incoming phone connections 2121 from the users and outgoing phone connections 2123 to the winning advertisers.

In one embodiment, the telephone receiving equipment 2101 and the telephone switching equipment 2103 are circuit switched, including Private Branch Exchange (PBX) and a dedicated voice network. Alternatively, the telephone receiving equipment 2101 and the telephone switching equipment 2103 may be package switched, including Internet Protocol (IP) based PBX, a data communication network and a gateway. In general, various telephonic techniques known in the art can be used.

When the telephone receiving equipment 2101 picks up a phone call, the control center 2105 determines whether or not further information is needed and/or can be obtained from the caller. For example, to determine a geographical area of interest, the control center 2105 can instruct the Interactive Voice Response (IVR) system 2107 to prompt the caller to key in the desired zip code. In one embodiment, Interactive Voice Response (IVR) is a telephony technology in which one may use a touch-tone telephone to interact with a database to acquire information from or enter data into the database without the help of a human concierge.

Further, the control center may direct the IVR system 2107 to prompt the caller to specify further criteria based on the advertiser information 2140. For example, when the phone number is for a group of mortgage brokers, the user may be directed to select loan sizes, loan types, etc.

Alternatively, the control center 2105 may instruct the geographic area locator 2109 to determine a geographic area from which the call is initiated. For example, the geographic area locator may use the cellular position system to determine the location of a cellular phone, or use a satellite/pseudolite position system to determine the location of a mobile device. Pseudolites are ground-based transmitters signals similar to a Global Positioning System (GPS). Pseudolites are useful in situations where signals from an orbiting satellite might be unavailable, such as tunnels, mines, buildings or other enclosed areas. A satellite/pseudolite signal receiver may determine its location and transmit the location through the cellular phone to a cellular communication system, or transmit the received signals to a location server which computes the location.

A cellular communication system may also determine the location of a cellular phone. For example, the location of a cellular phone can be determined using a method known as Time Difference of Arrival (TDOA) in which the reception times of a cellular signal from a mobile station are measured at several base stations to determine the position of the cellular phone. Alternative, a method known as Advanced Forward Link Trilateration (AFLT), or Enhanced Observed Time Difference (EOTD), can be used, which measures the reception times of cellular signals from several base stations to the cellular phone. Alternatively, the cellular site in which the mobile device can communicate to a based station can be used to determine a rough position of the cellular phone. In general, any method used by a cellular phone provider to get location information (e.g., for emergency service) can be used.

The control center 2105 may also instruct the Automatic Number Identification (ANI) unit 2111 to determine the phone number of the incoming call and look up the geographic area information from the database for the phone numbers.

Alternatively, the control center 2105 may connect the phone call temporally to a human concierge who can help the caller to specify a selection criterion (or criteria).

In one embodiment of the present invention, the control center 2105 uses a number of different types of information to select the winning advertiser based on the advertiser information 2140.

In one embodiment, the advertiser information 2140 include the identities of the advertisers (e.g., 2141), the geographic areas (e.g., 2143) of the advertisers, the phone number(s) (e.g., 2145) of the advertisers, the placement bids (e.g., 2147) of the advertisers, the availability statuses (e.g., 2149) of the advertisers, etc. In an alternative embodiment, more or less fields can be used for the advertiser information.

The availability may include the information about the projected waiting time for a caller to get through. The availability may also depend on the advertisement budget specified by the advertiser. For example, the advertiser may specify the advertisement budget in terms of the maximum number of calls in a day, the minimum time intervals between two calls, working hours, etc.

In one embodiment, in view of the caller's implicitly or explicitly specified requirements (e.g., the geographic area, the loan type, loan size, etc., if there is any), the control center ranks the advertisers according to the current advertiser information. For example, the control center may eliminate the advertisers that are not available or do not meeting the caller's requirements and sort the remaining candidates according to the bid for advertisement. The highest bidder in the remaining candidates is the winner. Alternatively, other types of sorting criteria can be used. For example, an indicator of the degree of matching between the caller's requirements can be weighted according to the advertisement bid to generate an indicator for selecting the winner.

After the winning advertiser is determined, the control center 2105 can instruct the telephone switching equipment 2103 to connect the incoming phone call to the phone number of the winning advertiser. The control center 2105 then creates a record entry in connection records 2130 to indicate the connection made for the advertiser. For example, a record entry may include information such as the from phone number 2131, the to phone number 2133, the time the connection is made 2135, the duration of the connection 2137, the media channel 2139 responsible for delivering the advertisement to the caller, the advertisement bid 2132 of the advertiser at the time of the connection, etc. Other information, such as whether or not a human concierge is involved, can also be recorded. In an alternative embodiment, more or less fields can be used for the connection records.

In one embodiment, the recorded connection information is used to generate invoice to bill the advertisers. An account of the advertiser may be debited automatically for the connection. Alternatively, a payment for the advertisement is collected automatically through an electronic system for the connection.

Figure 22:
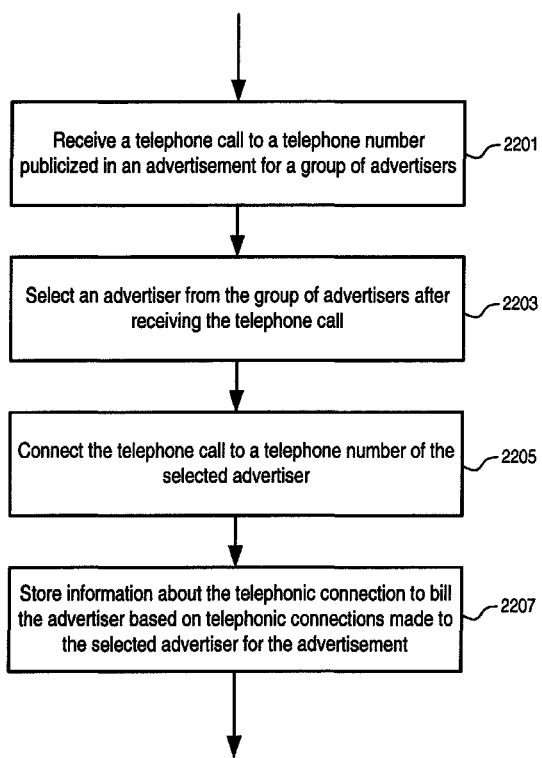
FIGS. 22-24 show flow diagrams of making and tracking phone connections according to embodiments of the present invention.
Figure 23:
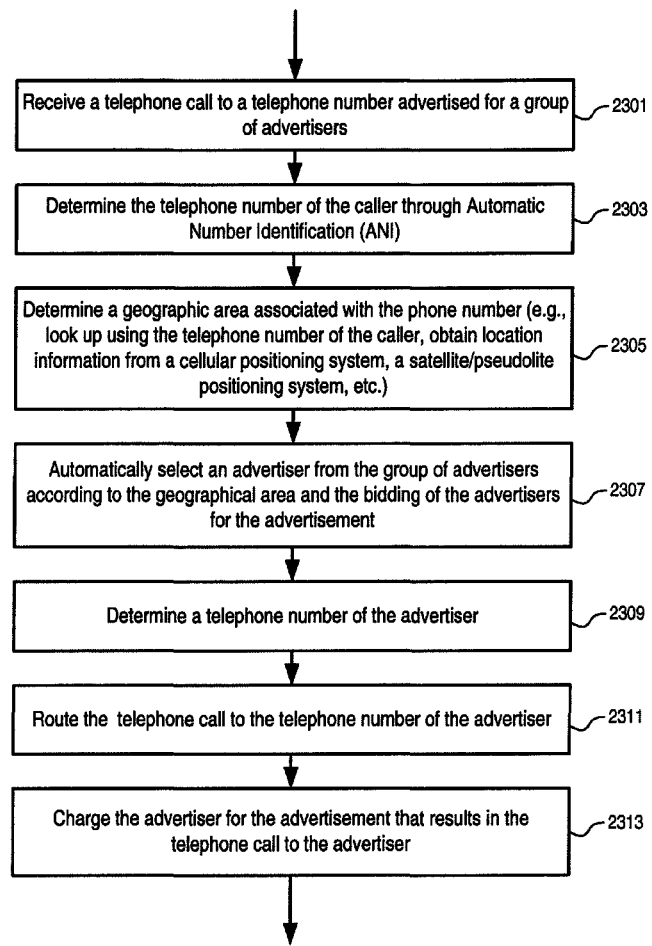
Figure 24:
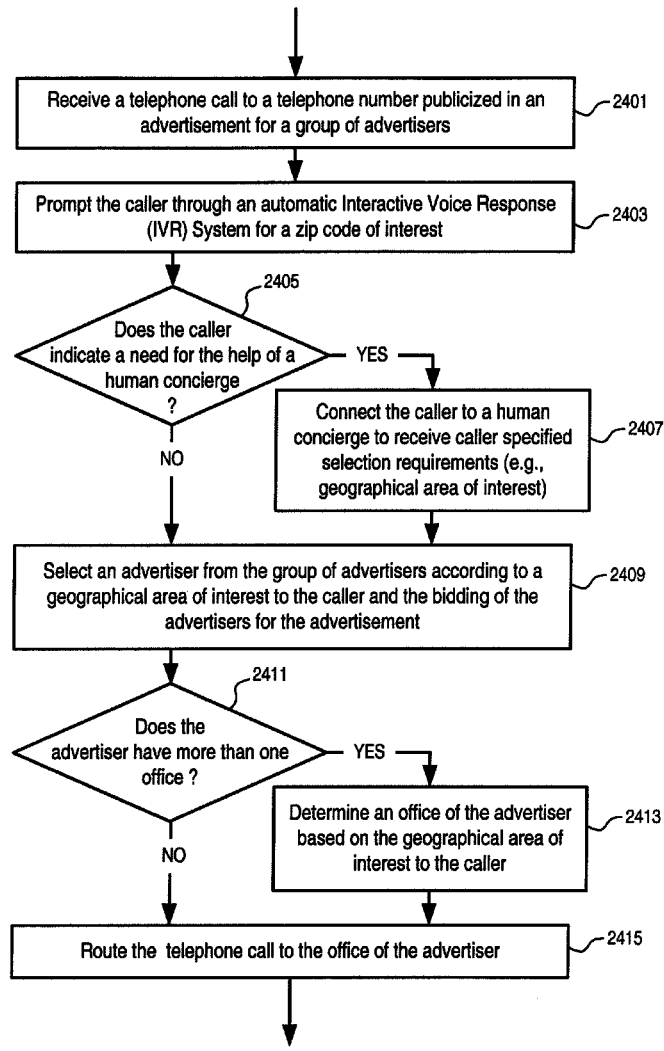

FIGS. 22-24 show flow diagrams of making and tracking phone connections according to embodiments of the present invention.

In FIG. 22, operation 2201 receives a telephone call to a telephone number publicized in an advertisement for a group of advertisers. Operation 2203 selects an advertiser from the group of advertisers after receiving the telephone call. Operation 2205 connects the telephone call to a telephone number of the selected advertiser. Operation 2207 stores information about the telephonic connection to bill the advertiser based on telephonic connections made to the selected advertiser for the advertisement. In one embodiment, the geographic area of interest to the caller is determined, which is used in selecting the advertiser as the receiver of the telephone call.

In FIG. 23, after operation 2301 receives a telephone call to a telephone number advertised for a group of advertisers, operation 2303 determines the telephone number of the caller through Automatic Number Identification (ANI). Operation 2305 determines a geographic area associated with the phone number (e.g., look up using the telephone number of the caller, obtain location information from a cellular positioning system, a satellite/pseudolite positioning system, etc.). Operation 2307 automatically selects an advertiser from the group of advertisers according to the geographical area and the bidding of the advertisers for the advertisement. Operation 2309 determines a telephone number of the advertiser. Operation 2311 routes the telephone call to the telephone number of the advertiser. Operation 2313 charges the advertiser for the advertisement that results in the telephone call to the advertiser.

For example, in one embodiment, the system looks at the phone number (obtained through ANI) of the incoming call and automatically routes it to the highest bidding mortgage broker in the geographic area of the phone number.

In FIG. 24, after operation 2401 receives a telephone call to a telephone number publicized in an advertisement for a group of advertisers, operation 2403 prompts the caller through an automatic Interactive Voice Response (IVR) System for a zip code of interest.

If operation 2405 determines that the caller indicates a need for the help of a human concierge, operation 2407 connects the caller to a human concierge to receive caller specified selection requirements (e.g., geographical area of interest, loan type, loan size, etc.).

Operation 2409 selects an advertiser from the group of advertisers according to a geographical area of interest to the caller and the bidding of the advertisers for the advertisement.

If operation 2411 determines that the advertiser has more than one office, operation 2413 determines an office of the advertiser based on the geographical area of interest to the caller.

Operation 2415 routes the telephone call to the office of the advertiser.

For example, in one embodiment, a customer is prompted on the telephone by an automatic IVR to key in the desired zip code. The system then routes the call to the highest bidding mortgage broker in that geographic area.

For example, in one embodiment, the customer is connected to a human concierge who asks for the desired geographic area and routes the call to the highest bidding mortgage broker in the desired geographic area.

For example, in one embodiment, a large national account which has local regional offices around the country, geography is ascertained using one of the above discussed methods and the call is then routed to the local office that best matches the geography.

In one embodiment of the present invention, an advertisement is for one single advertiser that has a number of different locations. The selection of the location of the advertiser and the corresponding target phone number is made at the time a phone call is received at a switch/router; and the selection may be automatic based on ANI or location information determined from a positioning system, or semi-automatic based on user interaction with an automated IVR, or non-automatic based on the user interaction with a human concierge. Alternatively, the advertisement can be for a group of different advertisers, some of which have different locations/branches in a large geographic area (e.g., a country, around the world, etc.).

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMs), Digital Versatile Disks, (DVDs), etc.), among others, and transmission type media such as digital and analog communication links.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method comprising:
   receiving, via a communication network, a received telephone call to a single advertisement telephone number associated with a single advertisement associated with a plurality of competing advertisers;
   identifying a geographic area related to an origin of the received telephone call;
   selecting, via a computing device, a first advertiser from the plurality of competing advertisers, based at least in part on the identified geographic area; and
   identifying, via the computing device, a separate previously assigned advertiser telephone number of the first advertiser;
   connecting, via the computing device, the received telephone call to the previously assigned advertiser telephone number of the first advertiser to track a telephone connection to the first advertiser established from the received telephone call to the single advertisement telephone number provided in the single advertisement.

2. The method of claim 1, further comprising:
   charging, via the computing device, the first advertiser a predetermined fee for the single advertisement in response to connecting the received telephone call, placed to the single advertisement telephone number provided in the single advertisement, to the previously assigned advertiser telephone number of the first advertiser.

3. The method of claim 1, wherein the first advertiser from the plurality of competing advertisers, is selected, at least in part, based on the identified geographic area and a respective bid of each of the plurality of competing advertisers for the advertisement.

4. The method of claim 3, wherein the first advertiser is charged a fee in accordance with the respective bid of the first advertiser for the single advertisement.

5. The method of claim 1, further comprising:
   determining a telephone number of the received telephone call via an automatic number identification service;
   wherein the geographic area related to the origin of the received telephone call is determined based on the telephone number of the received telephone call.

6. The method of claim 1, further comprising:
   receiving location information from a cellular communication system for the received telephone call;
   wherein the geographic area related to the origin of the received telephone call is determined based on the location information.

7. The method of claim 1, further comprising:
   receiving location information from a positioning system for the received telephone call;
   wherein the geographic area related to the origin of the received telephone call is determined based on the location information.

8. The method of claim 1, wherein:
   receiving a zip code in the received telephone call through an interactive voice response system; and
   the geographic area related to the origin of the received telephone call is determined based on the zip code.

9. The method of claim 1, further comprising:
   routing the received telephone call to a human operator;
   wherein the geographic area related to the origin of the received telephone call is determined by the human operator.

10. The method of claim 9, wherein at least one additional selection requirement is determined by the human operator, such that the first advertiser of the plurality of competing advertisers is selected based, at least in part, on the identified geographic area and the at least one additional selection requirement.

11. The method of claim 1, further comprising:
    receiving a voice indication of a geographic area in the received telephone call;
    wherein the geographic area related to the origin of the received telephone call is determined based on the voice indication.

12. The method of claim 1, wherein the first advertiser has a plurality of offices, and the identifying the separate previously assigned advertiser telephone number of the first advertiser includes determining a respective office of the plurality of offices based on the geographic area related to the origin of the received telephone call, such that the separate previously assigned advertiser telephone number is associated with the respective office.

13. A system comprising:
    at least one processor; and
    memory storing instructions configured to instruct the at least one processor to:
       receive, via a communication network, a received telephone call to a single advertisement telephone number associated with a single advertisement associated with a plurality of competing advertisers;
       identify a geographic area related to an origin of the received telephone call;
       select a first advertiser from the plurality of competing advertisers, based at least in part on the identified geographic area; and
       identifying a separate previously assigned advertiser telephone number of the first advertiser;
       connect the received telephone call to the previously assigned advertiser telephone number of the first advertiser to track a telephone connection to the first advertiser established from the received telephone call to the single advertisement telephone number provided in the single advertisement.

14. The system of claim 13, wherein the memory additionally stores instructions configured to instruct the at least one processor to:
    charging the first advertiser a predetermined fee for the single advertisement in response to connecting the received telephone call, placed to the single advertisement telephone number provided in the single advertisement, to the previously assigned advertiser telephone number of the first advertiser.

15. The system of claim 14, wherein the first advertiser from the plurality of competing advertisers, is selected, at least in part, based on the identified geographic area and a respective bid of each of the plurality of competing advertisers for the advertisement.

16. The system of claim 15, wherein the first advertiser is charged a fee in accordance with the respective bid of the first advertiser for the single advertisement.

17. A tangible machine readable medium storing instructions that, when executed by a computing device, cause the computing device to perform a method, the method comprising:
- receiving, via a communication network, a received telephone call to a single advertisement telephone number associated with a single advertisement associated with a plurality of competing advertisers;
- identifying a geographic area related to an origin of the received telephone call;
- selecting a first advertiser from the plurality of competing advertisers, based at least in part on the identified geographic area; and
- identifying a separate previously assigned advertiser telephone number of the first advertiser;
- connecting the received telephone call to the previously assigned advertiser telephone number of the first advertiser to track a telephone connection to the first advertiser established from the received telephone call to the single advertisement telephone number provided in the single advertisement.

18. The medium of claim 17, wherein the method further comprises:
- charging, via the computing device, the first advertiser a predetermined fee for the single advertisement in response to connecting the received telephone call, placed to the single advertisement telephone number provided in the single advertisement, to the previously assigned advertiser telephone number of the first advertiser.

19. The medium of claim 17, wherein the first advertiser from the plurality of competing advertisers, is selected, at least in part, based on the identified geographic area and a respective bid of each of the plurality of competing advertisers for the advertisement.

20. The medium of claim 19, wherein the first advertiser is charged a fee in accordance with the respective bid of the first advertiser for the single advertisement.

* * * * *